United States Patent
Fripp et al.

(10) Patent No.: US 10,166,726 B2
(45) Date of Patent: Jan. 1, 2019

(54) METHOD AND APPARATUS FOR ADDITIVE MANUFACTURING

(71) Applicant: FRIPP DESIGN LIMITED, Sheffield, South Yorkshire (GB)

(72) Inventors: Tom Fripp, Sheffield (GB); Neil Frewer, Sheffield (GB); Lewis Green, Sheffield (GB)

(73) Assignee: FRIPP DESIGN LIMITED, Sheffield (GB)

( * ) Notice: Subject to any disclaimer, the term of this patent is extended or adjusted under 35 U.S.C. 154(b) by 236 days.

(21) Appl. No.: 15/030,143

(22) PCT Filed: Oct. 24, 2014

(86) PCT No.: PCT/GB2014/053190
§ 371 (c)(1),
(2) Date: Apr. 18, 2016

(87) PCT Pub. No.: WO2015/059502
PCT Pub. Date: Apr. 30, 2015

(65) Prior Publication Data
US 2016/0263827 A1    Sep. 15, 2016

(30) Foreign Application Priority Data

Oct. 25, 2013  (GB) .................................. 1318898.2
Apr. 1, 2014   (GB) .................................. 1405879.6

(51) Int. Cl.
*B29C 67/00* (2017.01)
*B29C 64/106* (2017.01)
(Continued)

(52) U.S. Cl.
CPC ........ *B29C 67/0062* (2013.01); *B29C 64/106* (2017.08); *B29C 64/124* (2017.08);
(Continued)

(58) Field of Classification Search
CPC ............ B29C 67/0062; B29C 67/0055; B29C 67/0096; B29C 64/00; B29C 65/4865;
(Continued)

(56) References Cited

U.S. PATENT DOCUMENTS

2003/0090034 A1* 5/2003 Mulhaupt ............. B29C 31/045
264/255
2003/0114936 A1  6/2003 Sherwood et al.
2012/0296062 A1* 11/2012 Hoelzl ..................... C08J 9/286
528/28

FOREIGN PATENT DOCUMENTS

JP    H0820073 A    1/1996
WO    2002064353 A1    8/2002
(Continued)

OTHER PUBLICATIONS

UKIPO, Search Report for GB Patent Application No. 1318898.2, dated Apr. 15, 2014.
(Continued)

*Primary Examiner* — Stella K Yi
(74) *Attorney, Agent, or Firm* — NK Patent Law

(57) ABSTRACT

A method and device for producing a three-dimensional component by in-bath additive manufacturing comprising a bath (12) of a first fluid component and a nozzle (15) for dispensing a second fluid component. In use the nozzle is moved in the bath, and the fluid components react to produce said component. The second fluid component may be varied to change the visual and/or physical properties of the component. A computer (24) contains a digital record to control respective position of the nozzle and the bath.

18 Claims, 15 Drawing Sheets

(51) Int. Cl.
*B29C 64/124* (2017.01)
*B29C 64/35* (2017.01)
*B29K 83/00* (2006.01)
*B33Y 10/00* (2015.01)
*B33Y 40/00* (2015.01)
*B33Y 80/00* (2015.01)
*B29K 105/00* (2006.01)

(52) U.S. Cl.
CPC .......... *B29C 64/35* (2017.08); *B29K 2083/00* (2013.01); *B29K 2083/005* (2013.01); *B29K 2105/0061* (2013.01); *B33Y 10/00* (2014.12); *B33Y 40/00* (2014.12); *B33Y 80/00* (2014.12)

(58) Field of Classification Search
CPC ..... B29C 70/205; B29C 70/222; B29C 64/40; B29C 47/8895
See application file for complete search history.

(56) References Cited

FOREIGN PATENT DOCUMENTS

WO 2008086033 A1 7/2008
WO 2009139395 A1 11/2009

OTHER PUBLICATIONS

UKIPO, Examination Report for GB Patent Application No. 15136153, dated Sep. 29, 2015.
UKIPO, Examination Report for GB Patent Application No. 15136153, dated Nov. 26, 2015.

* cited by examiner

METHOD AND APPARATUS FOR ADDITIVE MANUFACTURING

TECHNICAL FIELD

This invention relates to additive manufacturing whereby a three-dimensional solid object is formed directly from a digital computer file.

BACKGROUND TO THE INVENTION

Additive manufacturing techniques are well known.

An example of additive manufacturing is 3D printing, in which an object is formed layer by layer. Additive manufacturing may be contrasted with conventional machining techniques in which material is removed by, for example milling and drilling.

The different kinds of additive manufacturing have method specific advantages and disadvantages. Factors to be considered are speed of manufacture, strength of material, accuracy of manufacture and limitations of shape and form inherent in the manufacturing process.

One method of additive manufacturing forms a solid component from liquid base material contained in a bath. The liquid is caused to solidify, generally in successive layers, until the finished component can be lifted from the bath. The excess liquid is drained for re-use, and the component is washed and dried. One feature of this method is that the component has uniform characteristics, which are defined by the base material. This may be very advantageous in some circumstances, but it would also be desirable to be able to vary some characteristics as the part is being manufactured. By way of example, variation of colour and/or material strength would significantly enhance the usefulness of components produced by this technique.

Whilst it may be possible to change the base liquid during manufacture, to achieve an outer layer of material with a different characteristic, this step may be slow and in any event the range of different compatible materials may be small.

Further, no satisfactory method of additive manufacturing cross-linked or actively cross-linking polymers, such as silicone elastomer components, has hitherto been devised, particularly at room temperature. Such components would be beneficial in numerous applications in which the stability, inertness, resilience, strength and/or temperature resistance of such materials are required.

What is required is an improved method and apparatus for additive manufacturing, in particular in-bath manufacturing, that can provide a variation of material characteristics within a component produced by these means and/or produce a polymer such as a silicone elastomer component that is suitably strong, resilient and dimensionally stable in a relatively rapid process.

SUMMARY OF THE INVENTION

According to a first aspect of the invention, there is provided a method of producing a three-dimensional component, and comprising the steps of providing a bath of fluid silicone; dispensing a fluid curing agent in said bath in a pattern defined by a digital record, said curing agent converting said base material to a solid in the vicinity thereof; and removing the solid component from said bath when complete.

This method concerns in-bath additive manufacturing as such, applied to a base material of silicone gel with a dispenser of liquid curing agent in the form of a suitable catalyst.

The silicone gel may be cross-linked or actively cross-linking. The catalyst may cause a controlled vulcanisation of the silicone gel, which accelerates a hardening of the fluid base material in the vicinity of the catalyst.

By actively cross-linking we mean that the gel is in the process of solidifying at a certain rate (typically hours or days to become a solid) due to the formation of additional cross-links.

The method may include the step of varying the curing agent whilst producing the component so as to change a characteristic thereof. Possible variations of visual or physical characteristic are noted above.

According to a second aspect of the invention there is provided a method of producing a three-dimensional component, and comprising the steps of providing a bath of a first fluid material; dispensing a second fluid material in said bath in a pattern defined by a digital record, said second fluid material converting said first fluid material to a solid in the vicinity thereof; varying said second fluid material whilst producing said component, so as to change a characteristic of the component; and removing the solid component from said bath when complete.

Such a method allows variation of the characteristics of the component by changing the qualities of the second fluid material. For example the second fluid material may act or react with the first fluid material to achieve a different characteristic relating to e.g. hardness, flexibility, resilience, durability, toughness, electrical conductivity, magnetism and the like. The second fluid material may add a characteristic to the first fluid material, in particular a visual characteristic such as colour, reflectivity or fluorescence.

The first fluid material may be a base material and the second fluid material may be a curing agent.

For the avoidance of doubt, in this specification the term 'curing agent' includes any fluid substance which can act or react with a fluid base substance to form a solid. An example of a curing agent is the so called 'hardener' of a two-part liquid material, such as an epoxy resin. Another example is the use of a liquid catalyst to solidify a gel, in particular a silicone gel. This specification should be read so that the terms 'base material' and 'curing agent' are interchangeable, it being generally immaterial which substance is added to the other to achieve solidification.

In an embodiment of the invention a fluid base material comprises a homogenous mixture of plurality of reactive fluid materials each of said fluid materials being stable in the mixture or solidifying at a relatively slow rate, and adapted for reaction with a respective curing agent dispensed into said bath to cause or accelerate the solidifying process.

Thus two different reactive combinations can be used in conjunction to obtain a component having independent qualities associated with one or other of the combinations.

The fluid base material, e.g. a polymer material such as the silicone gel, may be cross-linked or actively cross-linking. The catalyst may cause a controlled vulcanisation of the base material, which accelerates a hardening of the fluid base material in the vicinity of the catalyst.

According to a third aspect of the invention there is provided a method of producing a three-dimensional component, and comprising the steps of providing a bath of gel-like first fluid material; dispensing a second fluid material in said bath in a pattern defined by a digital record, said second fluid material converting said first fluid material to a solid in the vicinity thereof; wherein said component is neutrally buoyant, and is formed and supported in said first fluid material away from the walls of said bath so as to be accessible from all directions.

Such a method permits forming of a component in the bath in any direction, provided that access to dispense the second fluid material is possible. This in turn depends on the size of the bath and the degrees of freedom provided for the dispenser of second fluid material.

The first fluid material, e.g. a polymer material such as a silicone gel, may be cross-linked or actively cross-linking. The second fluid material may be a curing agent such as a catalyst which may cause a controlled vulcanisation of the first fluid material, which accelerates a hardening of the fluid base material in the vicinity of the curing agent/catalyst.

According to a fourth aspect of the invention there is provided a method of producing a three-dimensional solid component, and comprising the steps of providing a bath of a first fluid material; dispensing a second fluid material at the surface of said first fluid material in a horizontal two-dimensional pattern defined by a digital record, said second fluid material converting said first fluid material to a solid in the vicinity thereof; adjusting the respective level of said solid in said bath to permit said first fluid material to wet the upper surface of said solid, repeating said dispensing and adjusting steps to enlarge said solid in the vertical direction to form said component, and removing the solid component from the bath when complete.

In this embodiment a component may be constructed layer by vertical layer from the surface of the bath, the indexing dimension being determined by the effective penetration of the second fluid component into the first fluid component.

In the methods of the invention, the finished component may typically exhibit variation of visual and/or physical properties to suit the end use. A variety of colours may be used. The finished component may, for example, have hard and soft regions, or exhibit flexibility and/or resilience only at desired locations.

The methods of the invention may comprise dispensing of a second fluid material or curing agent via a nozzle. The nozzle may be movable with respect to the mounting thereof. The bath may also be movable with respect to a mounting. In one embodiment the nozzle is movable in the Z direction, whereas the bath is movable in the X and Y directions. The nozzle may be capable of articulation in a plane of the Z direction. The nozzle may be rotatable about the Z axis. The nozzle may direct material in the Z direction, or may direct material at an angle thereto. The bath may be rotatable about the Z axis.

The dispensing step may include injecting, jetting, spraying, depositing, printing or any other suitable process for placing the two reactive materials together.

The method and means of relative movement may be selected according to requirements, typically relying upon electric stepper or servo motors under control of a computer program containing the digital record.

The potential degrees of freedom of the point of dispensing provide that a component may be constructed in any direction, and may for example be formed downwardly or sideways. Furthermore layers may also be added in any direction, for example downwardly or sideways, depending only upon the provision of access for the nozzle. This is a substantial advantage over many prior art systems of additive manufacture, which are characterized by successive layers constructed from the bottom to the top.

The nozzle may include a closure valve at or adjacent the outlet thereof. Such a valve may be operated mechanically via a spring mechanism or other suitable means, or may be operated electrically or electronically, for example by a solenoid or other suitable means. The valve may be a needle-type valve. The nozzle may comprise more than one outlet, and an independent closure valve may be provided for each said outlet.

A nozzle cleaning cycle may be incorporated in the process for building the component in order to prevent or limit the nozzle(s) from clogging up during a build. The nozzle cleaning cycle may take approximately 5 minutes and be carried out at a pre-set time interval, for example after every 60 minutes of build time.

The methods of the invention may include the step of dispensing different curing agents to obtain different characteristics of the component. For example a plurality of reservoirs of different curing agents may be provided, the reservoirs being digitally selected in turn to permit the characteristics of the component to be changed during production thereof.

Thus, for example, a component of uniform quality may have several colours, each colour being imparted by a suitable curing agent. The curing agents may be coloured so as to impart the colour directly to a base material. A component may have hard and soft regions defined by curing agents supplied from respective reservoirs. A curing agent may impart both visual and physical properties to the base material.

In one embodiment a rotary dispensing head includes a nozzle for immersion in a bath of base material and for dispensing a curing agent, the dispensing head including a plurality of supply ducts connected to respective reservoirs of curing agents. In a method of the invention the dispensing head is moved angularly to connect the nozzle to a respective reservoir so as to dispense the required curing agent. The rotary dispensing head may include an electric motor responsive to digital control inputs defined by the digital record.

The methods according to any of the preceding aspects may comprise application of ultrasound to promote a localised mixing of the first and second fluid materials to enhance the rate of curing. The bath and/or nozzle may have ultrasound applied thereto by a suitable transducer.

According to a fifth aspect of the invention there is provided an additive manufacturing device comprising a bath for a fluid base material, and a nozzle for dispensing a curing agent for the base material, the nozzle and bath being relatively movable in three dimensions in a pattern defined by a digital record to produce a solid three-dimensional component incorporating the base material and the curing agent, and said nozzle being adapted for connection a plurality of reservoirs associated with different curing agents.

Such a device may be used to implement a method of the invention.

According to a sixth aspect of the invention there is provided an additive manufacturing device comprising a bath for silicone gel, and a nozzle for dispensing a liquid catalyst for said gel, the nozzle and bath being relatively movable in three dimensions in a pattern defined by a digital record to produce a solid three-dimensional component from a reaction of said gel and liquid catalyst.

The device may comprise a component for application of ultrasound to promote a localised mixing of the silicone gel or other cross-linked or actively cross-linking polymer and liquid catalyst to enhance the rate of curing. The component may be arranged to apply ultrasound to the bath and/or nozzle. The component may be a transducer.

This device, for producing a solid component from silicone gel, may be adapted to a plurality of different catalysts, so as to vary the visual or physical properties of the component produced by the device. Optionally the catalyst may accelerate the curing of a silicone gel which may be cross-linked or actively cross-linking by causing a controlled vulcanisation thereof.

According to a seventh aspect of the invention, there is provided a method of producing a three-dimensional component, and comprising the steps of providing a bath of a fluid first material; dispensing a fluid second material in said bath in a pattern defined by a digital record, contact between the first and second fluid materials converting one of said materials to a solid in the vicinity thereof; and removing the solid component from said bath when complete, wherein one of said first and second materials comprises a cross-linked or actively cross-linking polymer and the other of said first and second materials comprises a catalyst, the catalyst causing an acceleration of the cross-linking to convert the material to a solid.

The catalyst may be provided in the bath and the polymer may be dispensed via the nozzle. The catalyst may be mixed with a thickener e.g. to form a gel-like consistency to provide support for the three dimensional component as it is formed.

The method of the seventh aspect may be carried out in association with preferred features of the second, third or fourth aspects and/or using a device of the fifth or sixth aspects.

Other features and aspects of the invention will be apparent from the claims appended hereto.

The methods and additive manufacturing devices of the invention allow the production of a single component or multiple components in silicone elastomer having multiple hardnesses and grades without the requirement for the use of moulding or casting techniques. Thus by means of the invention, different types of silicone including conductive silicone, can be used in the same additive build process.

In addition, the methods and additive manufacturing devices of the invention allow the production of components by catalysing platinum cure silicone in a controlled manner.

Furthermore, by means of the methods and additive manufacturing devices of the invention a mixture of catalyst and silicone oil can be selectively placed into a bath of silicone oil and cross linker or vice versa to form 3D geometry.

BRIEF DESCRIPTION OF DRAWINGS

Other features of the invention will be apparent from the following description of several preferred embodiments shown by way of example only in the accompanying drawings, in which.

DESCRIPTION OF EMBODIMENTS

The preceding discussion of the background to the invention is intended only to facilitate an understanding of the present invention. It should be appreciated that the discussion is not an acknowledgement or admission that any of the material referred to was part of the common general knowledge as at the priority date of the application.

Throughout the description and claims of this specification, the words "comprise" and "contain" and variations of the words, for example "comprising" and "comprises", means "including but not limited to", and is not intended to (and does not) exclude other components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers or characteristics, and compounds described in conjunction with a particular aspect, embodiment or example of the invention are to be understood to be applicable to any other aspect, embodiment or example described herein unless incompatible therewith.

Figure 1:
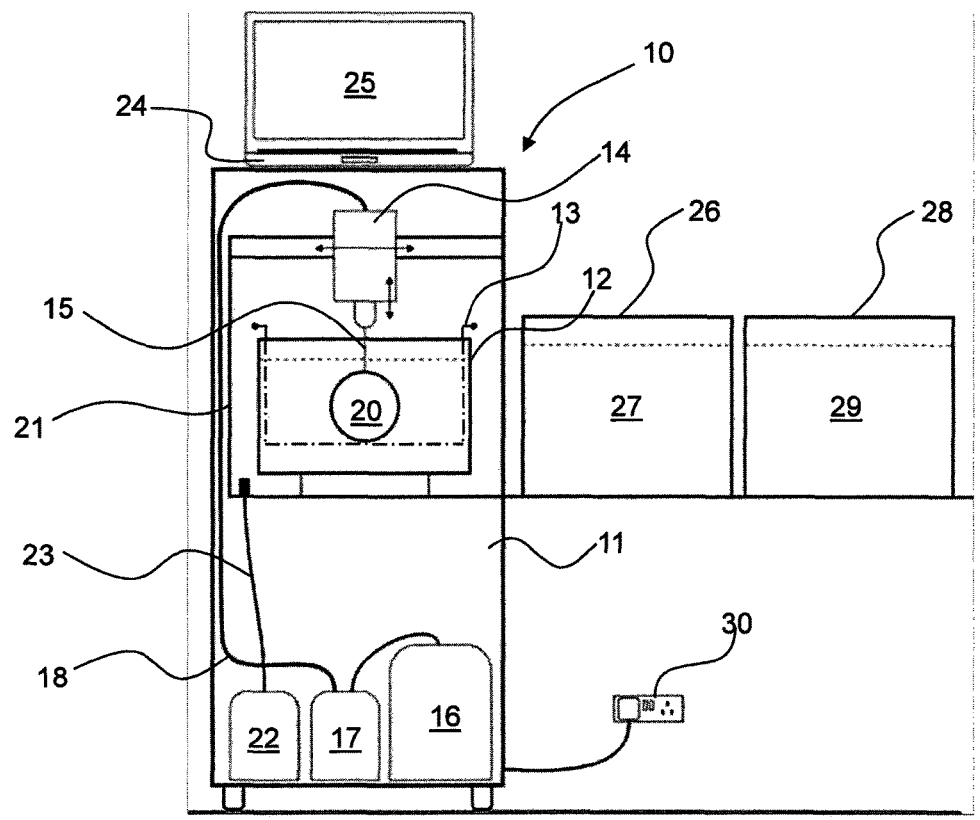
FIG. 1 is a schematic front elevation illustrating an embodiment of a device for use in the invention.

With reference to FIG. 1, an embodiment of a 3D printing device 10, for producing components by in-bath additive manufacturing, in accordance with the invention is illustrated schematically. A stand 11 or other kind of free-standing unit supports an open-mouthed bath 12 within which is provided a removable basket 13. Above the bath 12, a dispensing head 14 is movable on X, Y and Z axes with respect to the stand 11, and has a downwardly facing injection nozzle 15.

In the base of the stand is provided an air compressor 16 and an air regulator/reservoir 17 for supply compressed air via an inlet line 18 to the dispensing head 14. A component 20 is illustrated in the bath 12.

The bath 12 and dispensing head 14 is contained within a closed containment 21 which can be evacuated on demand by means of a vacuum pump 22 having a vacuum line 23.

The stand 11 also supports a computer 24 having a display 25 At the side of the stand are illustrated a washing station 26 comprising a washing liquid 27, and a rinsing station 28 comprising a rinsing liquid 29. A drying station (not illustrated) may also be provided. Electrical power for the device 10 is provided from a domestic or industrial electrical supply 30.

Figure 2:
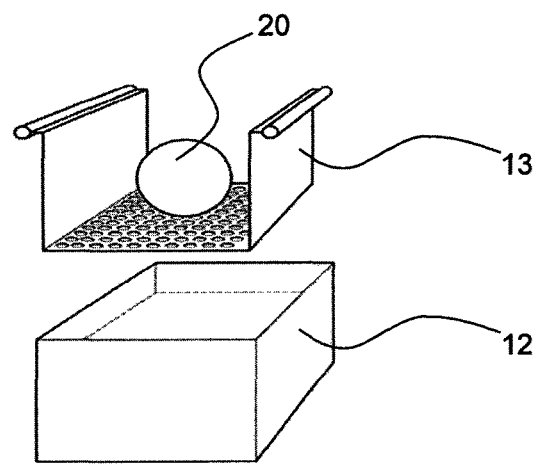
FIG. 2 illustrates a support and bath of FIG. 1.

FIG. 2 illustrates in more detail the bath 12, basket 13 and component 20. The basket 13 is movable relatively upwardly from the bath 12, and has holes or a mesh in the base thereof to allow drainage of excess fluid back into the bath.

One mode of operation of the device is now described.

The containment 21 is opened, and the bath is filled with a first fluid component from which the component 20 is to be created. In an embodiment of the invention, this fluid comprises a viscous silicone gel having the consistency of treacle. The containment is then closed, and evacuated by means of the vacuum pump 22 so as to remove any air which has been entrained in the first fluid component.

The nozzle 15 is then lowered into the bath to a predetermined position which is selected as the starting point for production of the component 20. The component is defined by a digital record of the computer 24, for example a CAD (computer aided design) file, and the digital record is executed by a suitable program of known kind. A second fluid component is provided to the nozzle 15, and comprises a catalyst or hardener for the first fluid component.

Suitable valving is provided to permit injection of the second fluid component into the first fluid component, under pressure from the regulator/reservoir 17, whilst moving the nozzle in three axes within the bath 12 according to the digital record. A typical injection pressure is 4.6 bar (70 psi). The valving may be controlled a spring or be electronically controlled i.e. by a solenoid or other suitable means. Upon contact of the first and second fluid components the first fluid component is solidified, thus allowing the component to be created by additive manufacture. Resolution of the component is determined by factors comprising for example, the dispensing rate of the second component, the injection pressure, the outlet area of the nozzle, the speed of movement of the nozzle, and the speed of reaction between the first and second fluid components. A typical time for completion of a component is 20 minutes. A typical speed of movement of the nozzle is up to 8 mm per second.

The display 25 may be used to illustrate progress of the component, and in particular may give a representation of the stage of component completion, for example by generating a 3D image from the digital file, and audible indications of the stage of component completion. Although a separate computer/display is illustrated, the screen and other hardware may be built-in to the stand 11.

Upon completion the containment 21 is opened, and the component 20 is removed from the bath in the basket 13. Excess of the first fluid component is allowed to drain into the bath before transfer of the basket to the washing station 26. The washing station may comprise agitation and spray devices to ensure that excess of the first fluid solution is substantially removed from the component, for example from recesses and internal spaces; this stage may take around two minutes. The washing fluid may be a suitable solvent, and in the case of a silicone gel—e.g. a cross-linked/actively cross-linking silicone gel—may be an isopropyl alcohol such as white spirit.

The component 20 may be dusted with a powder, for example bicarbonate of soda or chalk, prior to commencement of the washing process. The dusting should be sufficient enough that the powder clumps around any unsolidified first fluid component i.e. uncured silicone, thus allowing it to be more easily washed off using the washing fluid or a detergent.

After washing, the basket and component is transferred to the rinsing station, and is thoroughly soaked and rinsed in, for example, a mild detergent; this stage may take around five minutes. Finally the component is removed for drying and use.

Before construction of a new component it may be necessary to top up the bath, prior to closing the containment and de-gassing the first fluid component via the vacuum pump 22. Furthermore the nozzle may be returned to a 'home' position in which the X, Y and Z co-ordinates are re-set.

The nozzle 15 may include a 'suck-back' feature whereby fluid therein is withdrawn to prevent dripping or contamination of a succeeding fluid. Such a feature may typically comprise a vacuum device connected to the vacuum pump 22.

In the foregoing description, a manual process is envisaged; however the process steps could of course be automated with a suitable transfer device for moving the basket from the containment 21 to the washing and rinsing stations 26, 28. Alternatively the bath 12 could be removed, and substituted by the washing and rinsing stations in turn. Furthermore, depending on the nature of the first fluid component and the component to be produced, it may not be necessary to provide both a washing and a rinsing station.

In FIGS. 1 and 2, the component 20 is illustrated on the base of the basket 13. It will however be appreciated that the component may have neutral buoyancy with respect to the first fluid component, so that it may be produced in the bath without touching any surface of the basket. Furthermore, by selecting an appropriate stiffness of the first fluid component, the component remains stationary during production thereof—thus avoiding the requirement for an external support surface.

In the alternative, the component may be formed by solidifying successive two-dimensional horizontal layers on or adjacent the surface of the first fluid material. In such a process the two-dimensional shape is defined by the digital record, and has a pre-determined thickness which is a consequence the penetration of the second fluid component. After completion of a two-dimensional layer, the part-completed component is lowered with respect to the surface of the first fluid material, so that the first fluid material washes over the upper surface of the component to a depth equivalent to the effective penetration of the first fluid component. The process is then repeated to allow a component to be formed in the vertical direction.

It will be understood that the component may be supported or retained with respect to a tray or basket which may be successively lowered in the bath, or the bath may be successively raised with respect to the component.

In this alternative, it will be understood that the second fluid component may be dispensed at almost negligible pressure, by stream, spray or mist.

As described the dispensing head is movable in the three mutually orthogonal axes. However it will be appreciated that the bath may also be traversed in two mutually orthogonal axes (X, Y), so that the required relative movement may be achieved by a combination of movement of the dispensing head and the bath. For example the bath may be mounted on a conventional X-Y table, whereas the dispensing head may move solely in the Z direction.

It is also possible, if required, to allow for arcuate movement of the bath and dispensing head. For example the bath could move angularly in the X-Y plane, and the dispensing head could both move angularly about the Z axis, and articulate in a plane of the Z axis.

In the description of FIGS. 1 and 2, injection of second fluid component under pressure is described. However any practicable method of introducing the second fluid component may be used, including jetting, misting, and the like. Pressure may be applied in any suitable manner, and may be just sufficient to ensure that the second fluid component can exit the nozzle in the required amount.

By way of example the first fluid component may be a room temperature vulcanizing (RTV) liquid silicone rubber suitable for mould making and casting. Such a material is a clear or white opaque fluid typically having a specific gravity of 1.0 at 25° C., and is soluble in water. This material may comprise 75-100% organofunctional siloxanes, and may include silicone and like materials. Such materials may comprise a silicone oil and a cross-linker, together wither a filler/thickener such as fumed silica or high molecular weight silicone to form a gel with the desired starting viscosity. These materials typically cross-link under ambient conditions at a relatively slow rate.

The second fluid component may be a conventional liquid catalyst suitable for a RTV liquid silicone rubber. Such a catalyst accelerates the cross-linking process, to result in a more rapid solidification. A suitable catalyst may be a platinum or rhodium catalyst.

In other embodiments the catalyst may be mixed with a thickener such as fumed silica to form a gel and be placed in the bath. A suitably liquid mixture of silicone oil and cross-linker may be dispensed into the catalyst from the nozzle(s) to form the component.

Another example of suitable materials in an aerogel, an ultra-light material formed by reaction of a silicone and a catalyst, followed by supercritical drying. The base material is a silicon dioxide gel which is solidified by a catalyst. Once formed the component is subjected to supercritical drying whereby as much as 98% of the water content is removed whilst retaining the original shape and size of the component.

The use of aerogels, in conjunction with different visual and physical properties imparted by the methods of the invention leads to a new class of useful and commercial products.

Figure 3:
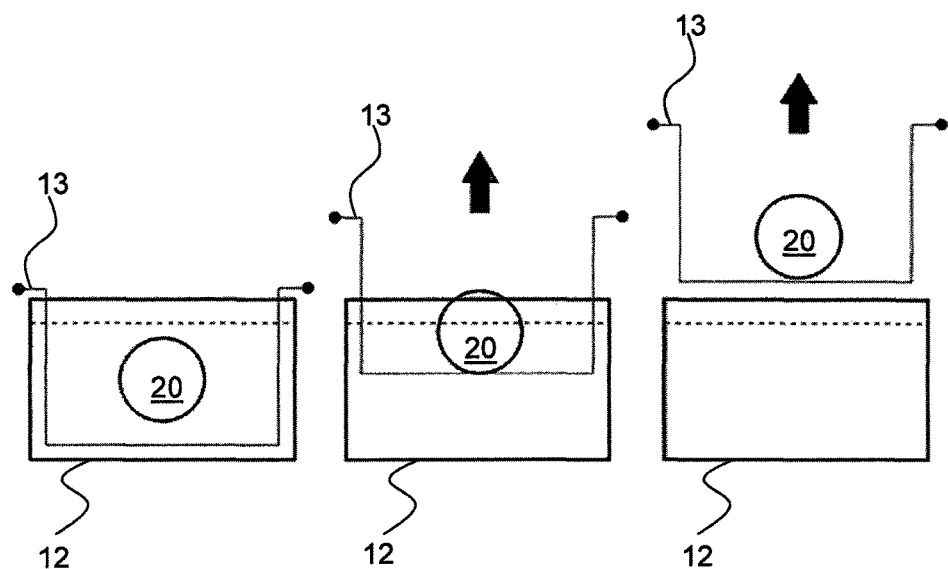
FIG. 3 illustrates stepwise a first component removal technique.
Figure 4:
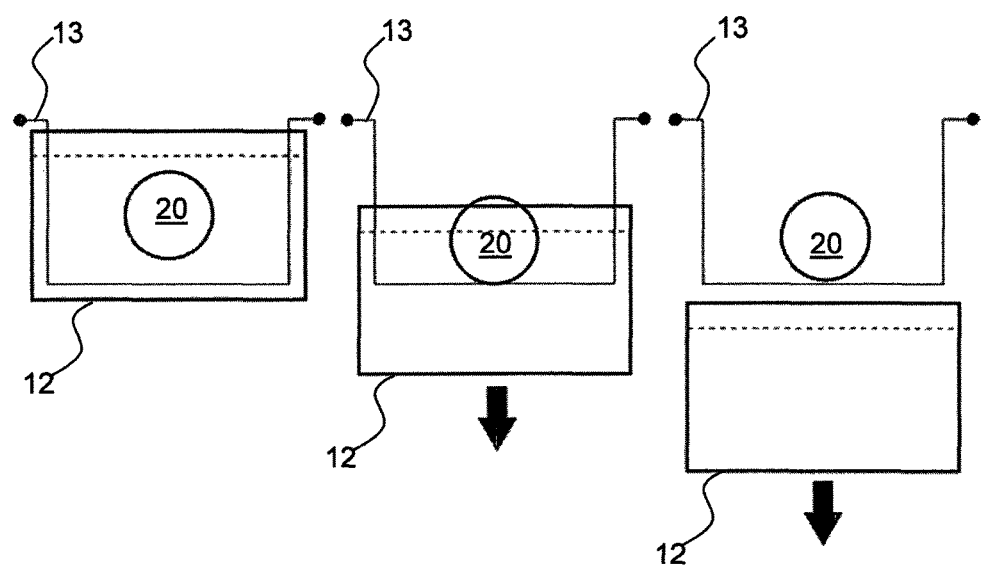
FIG. 4 illustrates stepwise a second component removal technique.

FIGS. 3 and 4 illustrate alternative ways of removing a finished component from the bath 13. FIG. 3 illustrates successive steps in lifting an immersed component in the basket 13 from the bath 12. FIG. 4 illustrates the alternative of dropping the bath with respect to the basket 13.

As described the first fluid component is a base material to which is added the catalyst or hardener comprising the second fluid material. It is envisaged that these materials could be interchanged, so that the bath contains the catalyst/hardener and the base material (e.g. silicone) is dispensed via the nozzle.

In one aspect of the invention, the first and second fluid materials may have properties that can be varied; these properties may affect both the visual and the physical nature of the component which is produced in the bath 13.

In one embodiment the nozzle may dispense a coloured fluid, so that the component is a different colour to that of the fluid contained in the bath. The fluid in the bath may for example be colourless, and the nozzle may dispense a coloured fluid which provides colour to the component as it is formed by, for example, diffusion through the fluid contained in the bath.

In one example, the colour of the dispensed fluid may be changed during production of the component, to produce a multi-coloured component. The variety of colour change is limited only by the connection of suitable colour reservoirs to the nozzle. These reservoirs may be contained in the stand as a ready coloured fluid for the nozzle, or may comprise a bank of coloured pigments from which a desired colour is mixed for addition to a fluid of the nozzle. Conventional colour mixing and dispensing technology may be applied. Thus a component having uniform physical properties may be multi-coloured.

The fluid to be dispensed through the nozzle may be supplied from a cartridge-like system similar to that of an ink jet printer. The cartridge may include a nozzle or nozzles with an associated fluid reservoir or reservoirs. The digital record typically controls such a cartridge, in the manner of an ink-jet printer to set parameters of jet pressure according to the fluid to be dispensed and the associated nozzle. For example narrow and wide jets may be provided according to the required 'printing' width.

The nozzle or nozzles may be adapted to vibrate or may include a vibration device for promoting mixing of the dispensed fluid in the bath. Such an arrangement may improve the uniformity of the component being produced. A piezoelectric oscillator attached to the nozzle, or immediately adjacent the nozzle may be suitable.

The nozzle may have multiple apertures to permit one aperture to be associated with a respective coloured fluid, or to permit several coloured fluids to be dispensed at the same time. The digital file may take account of the co-ordinates of the or each nozzle aperture in order to allow precise dispensing of the nozzle fluid.

In another embodiment the nozzle may dispense a fluid which reacts differently with the fluid in the bath so as to achieve a different physical quality in the component. For example the hardness, resilience, flexibility, durability, toughness, electrical conductivity and magnetism may all be parameters which can be influenced by the respective natures of the first and second fluid components. Speed of reaction is one factor which may influence such parameters.

Aspects concerning visual and physical properties may be mixed in the nozzle, so that for example a soft part of the component may have a first colour, and a relatively hard part of the component may have another colour.

Figure 5:
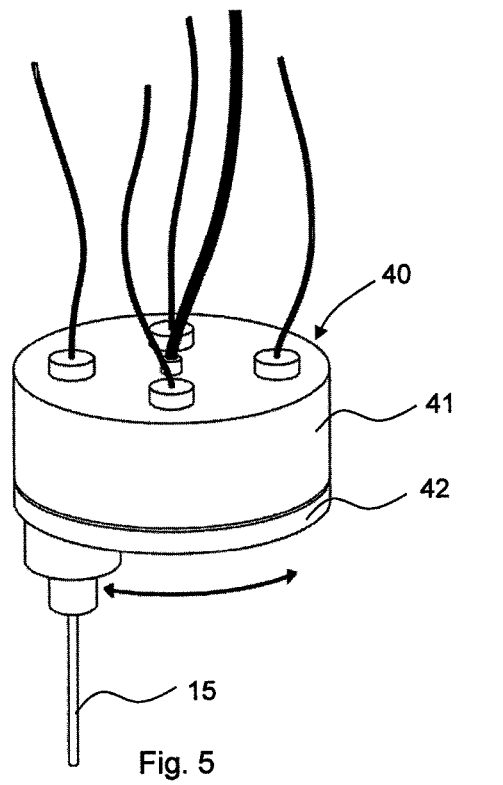
FIG. 5 illustrates a rotatable nozzle head from above.
Figure 6:
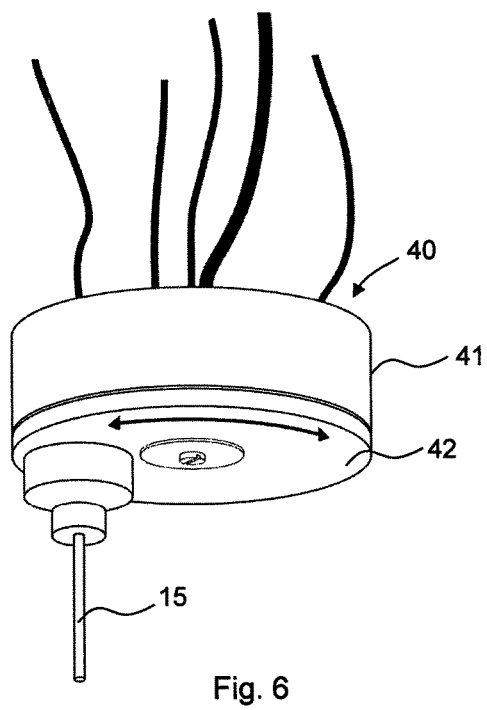
FIG. 6 illustrates a rotatable nozzle head from below.
Figure 7:
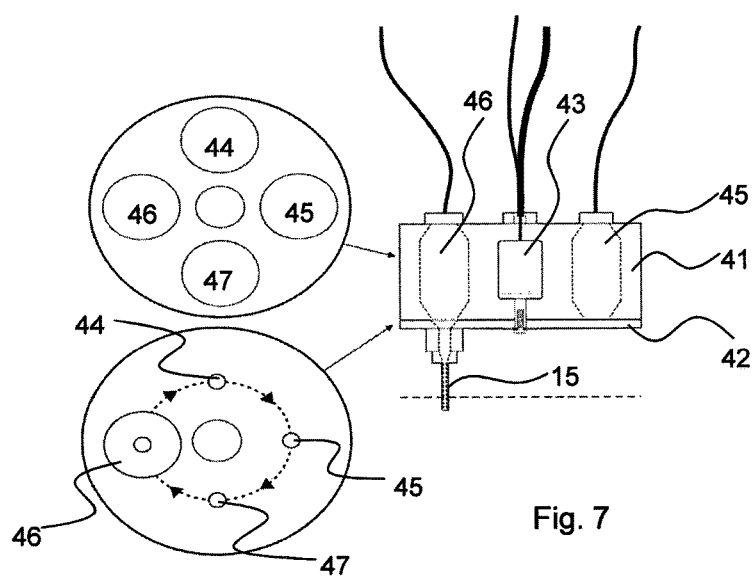
FIG. 7 illustrates the head of FIGS. 5 and 6 in side elevation, with a schematic of the stationary and rotating components.

FIGS. 5-7 illustrate one embodiment of a machine head for dispensing fluids having different properties.

A dispensing head 40 includes a stationary component 41 and a relatively rotatable component 42 to which is attached the nozzle 15. An electric stepper motor 43 within the stationary part is operable to rotate the rotatable component to align one of four reservoirs 44-47 with the nozzle 15. Each reservoir includes a pressure feed line connected to the reservoir/regulator 17 (FIG. 1) via a suitable control valve arrangement.

In use the desired reservoir 44-47 is aligned with the nozzle to dispense a fluid having a desired property, for example influencing the colour and/or physical nature of the component in the bath, the nozzle being positioned on the component at the desired location after each angular movement of the rotatable component 42.

As an alternative the nozzle could remain relatively stationary whilst the part 41 is allowed to reciprocate through 270°. A greater or fewer number of reservoirs 44-47 could be provided, and the reservoirs could be remotely located on the stand 11, as described above.

Figure 8:
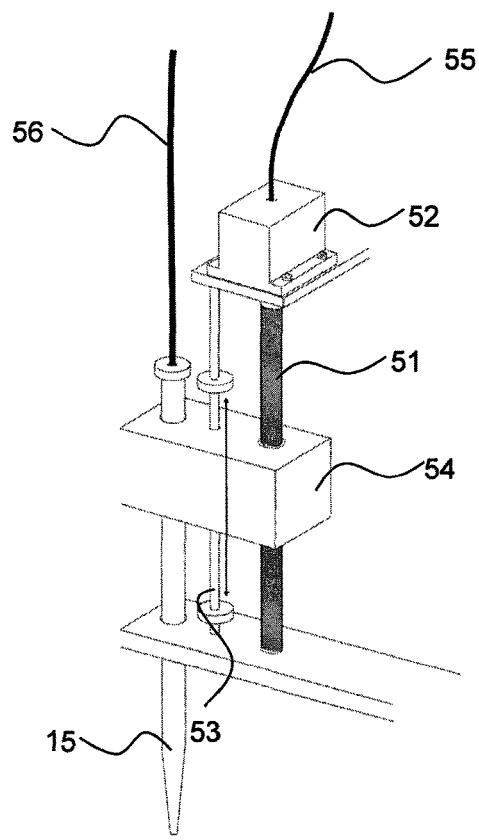
FIG. 8 illustrates a vertically movable nozzle head of the invention.

FIG. 8 illustrates an embodiment in which the nozzle 15 is movable vertically by means of a rotatable screw 51 powered by an electric motor 52. A guide rail 53 defines upper and lower limits of movement, which may be adjustable, to suit the depth of the first fluid component in the bath 12. The nozzle is carried by a guide block 54 through which passes both the guide rail 53 and screw 51. An electrical power and control lead 55 is connected to the motor, and a fluid supply line 56 is connected to the nozzle 15. This arrangement may of course be adapted to the supply of a variety of nozzle fluids.

Figure 9:
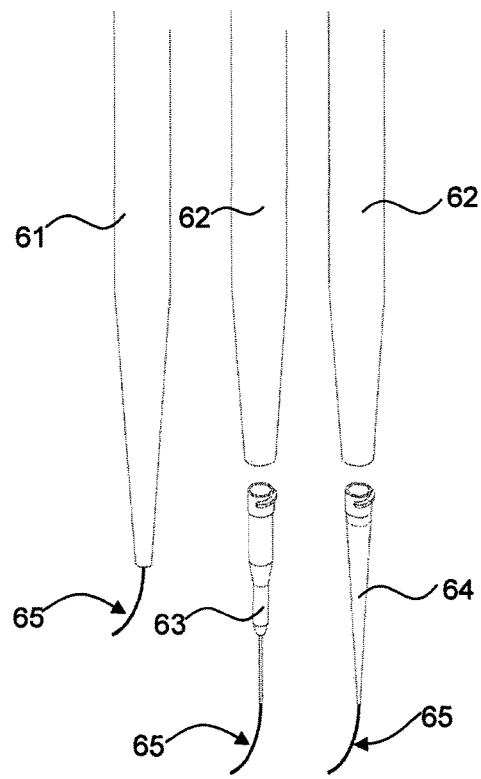
FIG. 9 illustrates three alternative nozzles for the head of FIG. 8.

FIG. 9 illustrates some alternative nozzle configurations. The nozzle may comprise a unitary component 61, or a two-part component consisting of a tubular main body 62 and a replaceable tip. Two kinds of replaceable tip are illustrated, and comprising a parallel hypodermic-type needle 63, and a tapered hollow tip 64. A thread of fluid 65 is shown emerging from each kind of nozzle. The two-part nozzles are illustrated with a quick start attachment thread, though any suitable means of retention may be used.

The nozzle 15 may have a variety of nozzle shapes, according to the shape which is required as the solid component is constructed in the bath. For example the nozzle could be round, oval, rectangular or slit-like; the nozzle may be oblique, and may have a single aperture or a plurality of apertures. A removable nozzle facilitates a change of aperture, and may be automated.

Furthermore the nozzle may be heated and/or cooled to vary the speed of reaction of the reactive fluid components. A Peltier device could be used, for example, to conduct heat to or from the nozzle.

Figure 10:
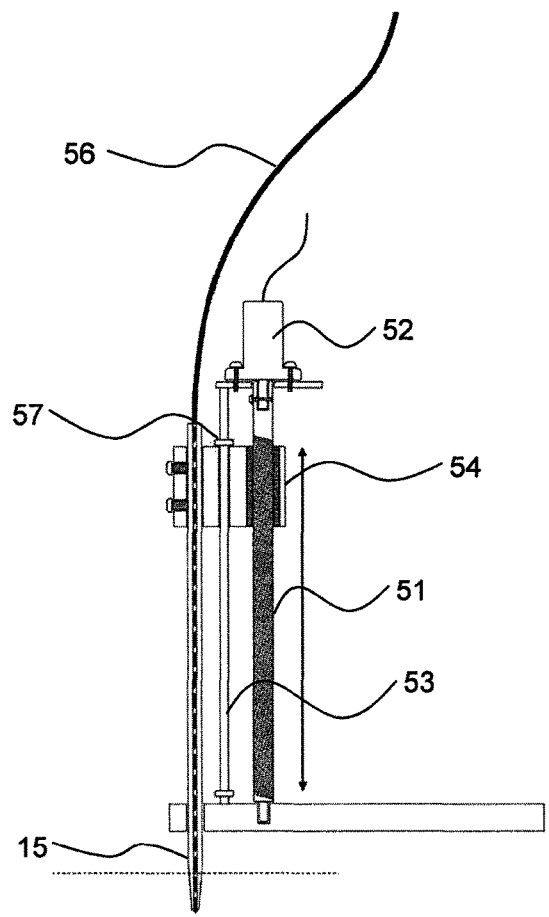
FIGS. 10 and 11 are side elevations showing the head of FIG. 8 in the up and in the down conditions.
Figure 11:
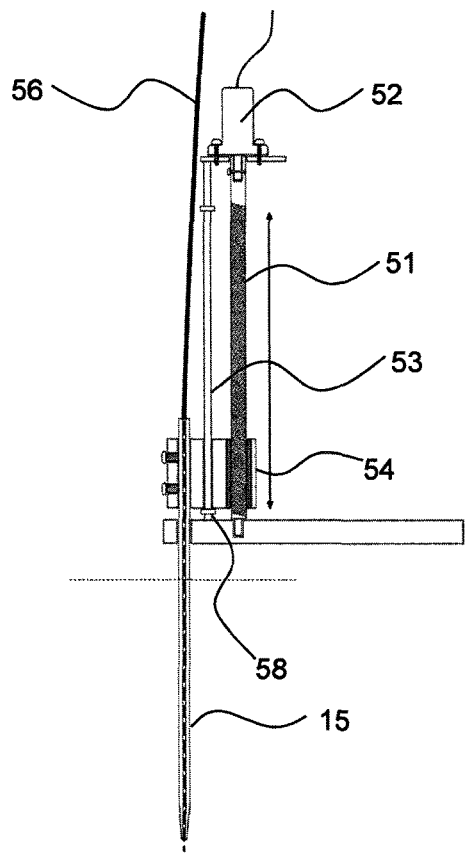

FIGS. 10 and 11 illustrate the embodiment of FIG. 8 in the extreme up and down conditions, as determined by the upper travel stop 57 and lower travel stop 58.

Figure 12:
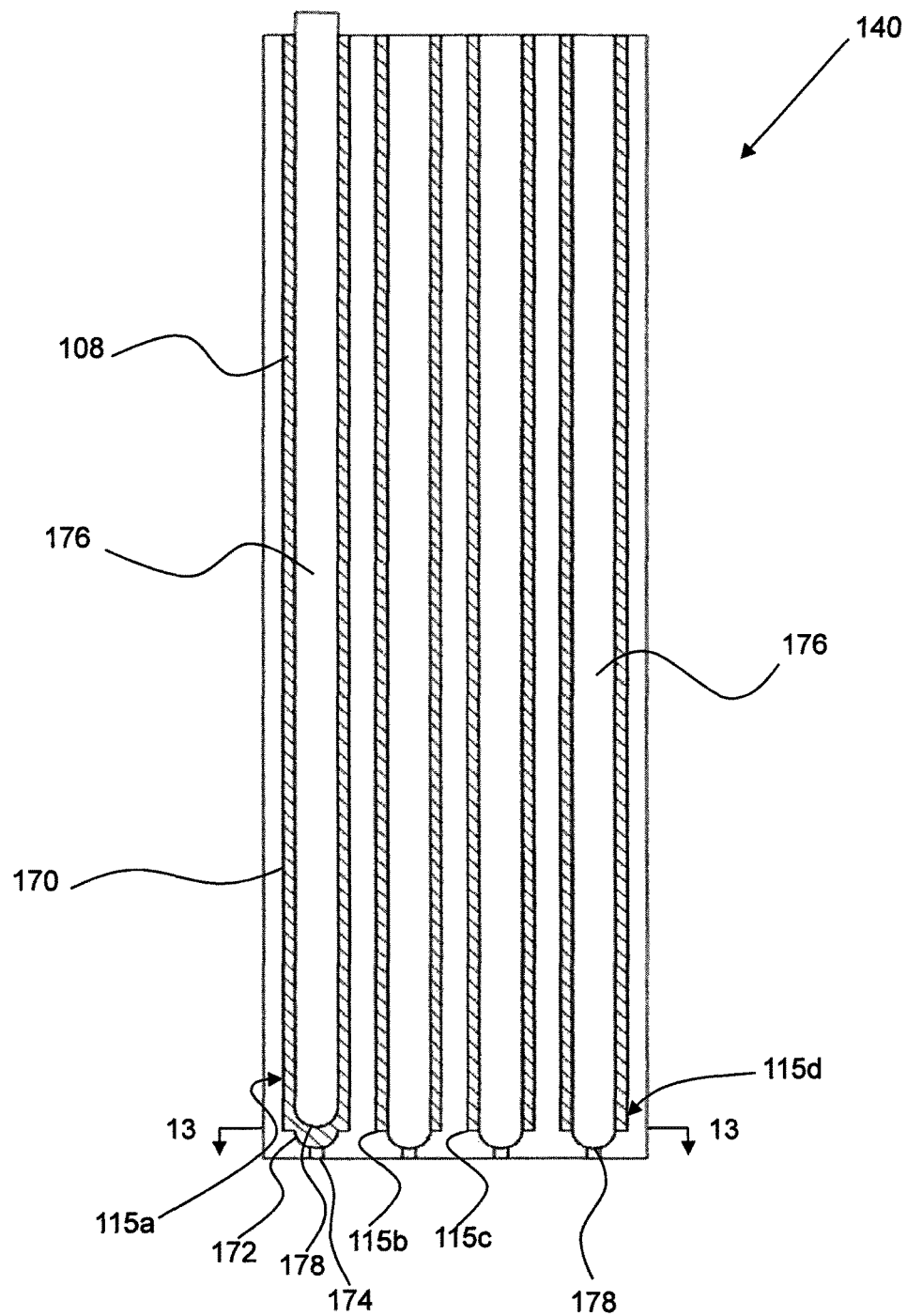
FIGS. 12 and 13 are vertical and horizontal cross-sections through a nozzle head of another embodiment of the present invention.
Figure 13:
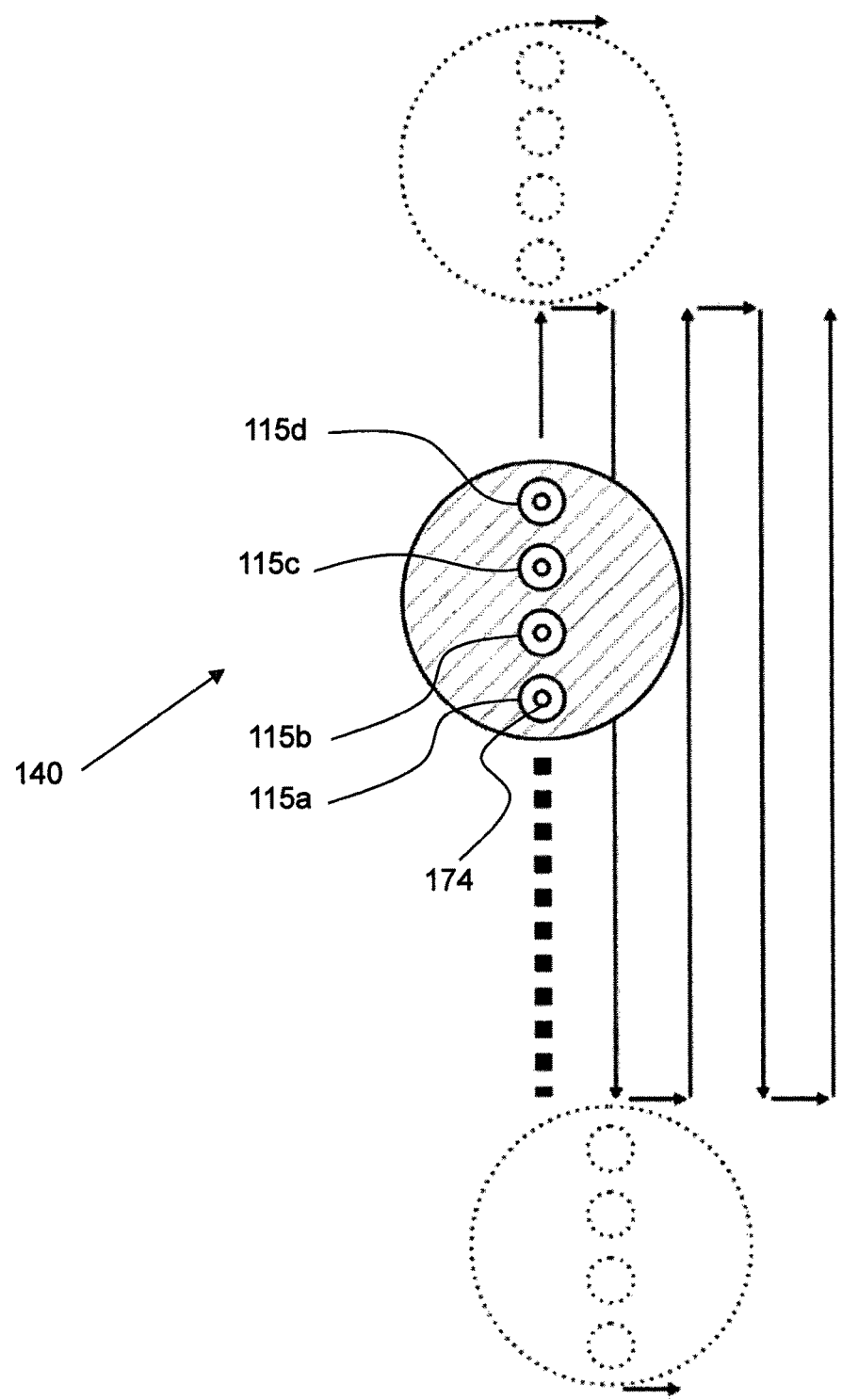

FIGS. 12 and 13 illustrate an alternative embodiment of a head 140 for dispensing of fluid 108 as part of a device 10 such as that of FIG. 1. The head has one or more nozzles. Typically there is more than one nozzle and the fluid in each nozzle may have differing properties. This may for example be four catalyst fluids each coloured differently using suitable pigments to provide cyan, yellow, magenta and black (CYMK). In this embodiment the head 140 comprises four nozzles 115*a*, 115*b*, 115*c* and 115*d* arranged in a single row, and being fed under with fluid under pressure from individual reservoirs (not shown). In other embodiments there may be additional rows or other suitable nozzle layouts.

With reference to the first nozzle 115*a*, each nozzle comprises a cylindrical chamber 170 with a rounded (hemispherical) valve seat 172 and a relatively small hole 174 at the end thereof. A valve stem 176 of smaller diameter than the chamber 170 and co-axially aligned therewith is located in the chamber and has a tip 178 shaped to mate with the valve seat 172 to form a needle valve-type arrangement. An actuator (not shown) controlled by a suitable control system (not shown) selectively lifts the valve stem to allow the fluid 108 to be dispensed from the holes 174. For example, the actuator may be controlled a spring or be electronically controlled i.e. by a solenoid or other suitable means. By controlling the rate of flow of each coloured fluid as the head moves, a particular colour can be imparted to the first fluid component in the bath 12.

FIG. 13 illustrates a cross-section through the head 140 on the line 13-13 of FIG. 12, and a reciprocating path relative to the bed that the head may take in operation to build up a layer of solid material.

Dependent upon the resolution of the desired article, the diameter of the holes 174 is normally in the range of between 10 µm and 100 µm. In other embodiments alternative complementary valve seat and valve tip shapes may be used, such as flat or conical shapes.

Figure 14:
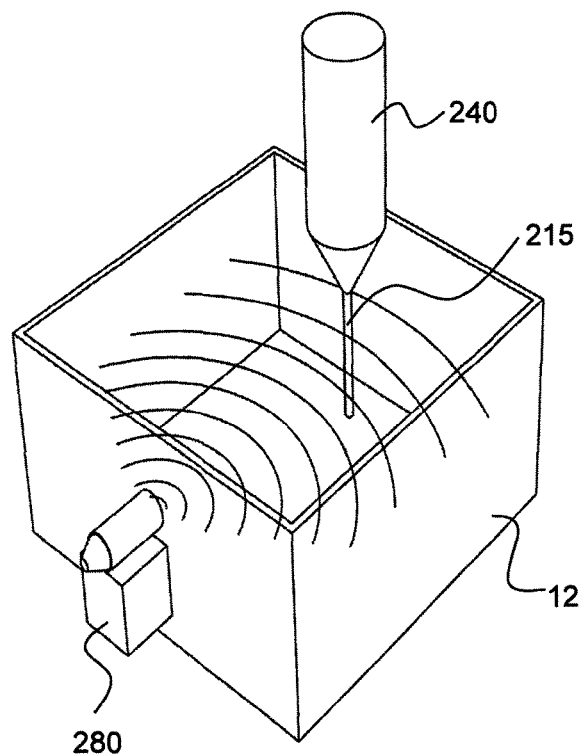
FIG. 14 is a perspective view of a device according to another embodiment of the present invention.

FIG. 14 illustrates a bath 12 and dispensing head 240 having a nozzle 215. An ultrasound transducer is mounted to the bath 12 so as to rapidly agitate the base fluid within the bath so as to enhance mixing with fluid dispensed from the nozzle 215.

Figure 15:
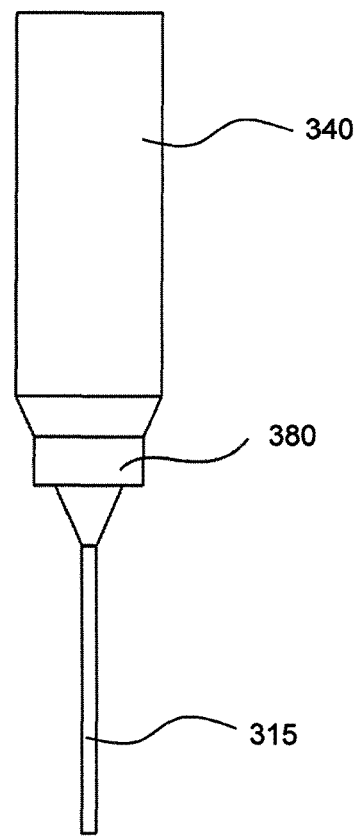
FIG. 15 is a side view of a nozzle according to another embodiment of the present invention.
Figure 16:
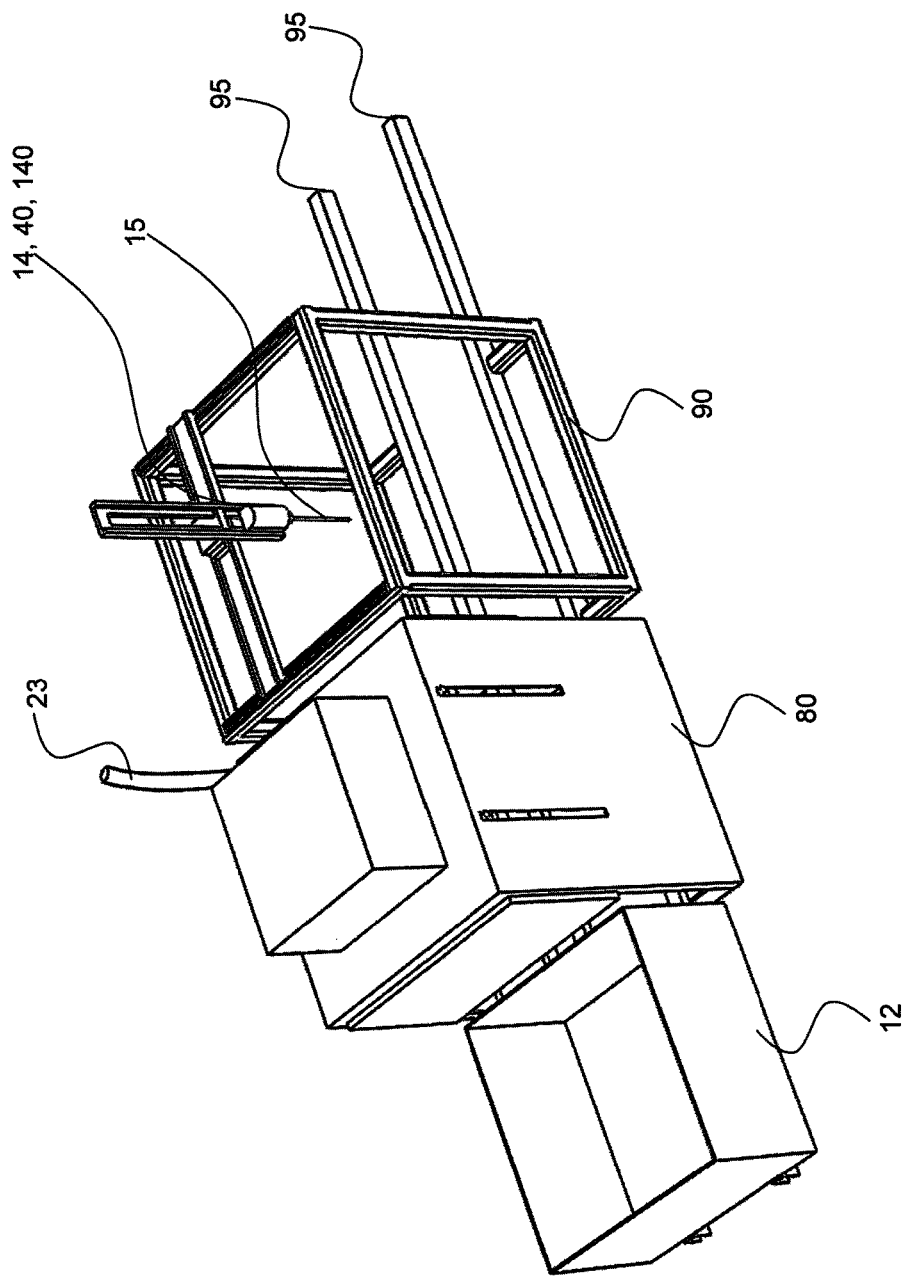
FIG. 16 is a perspective view of units forming part of a second embodiment of a device for use in the invention.
Figure 17:
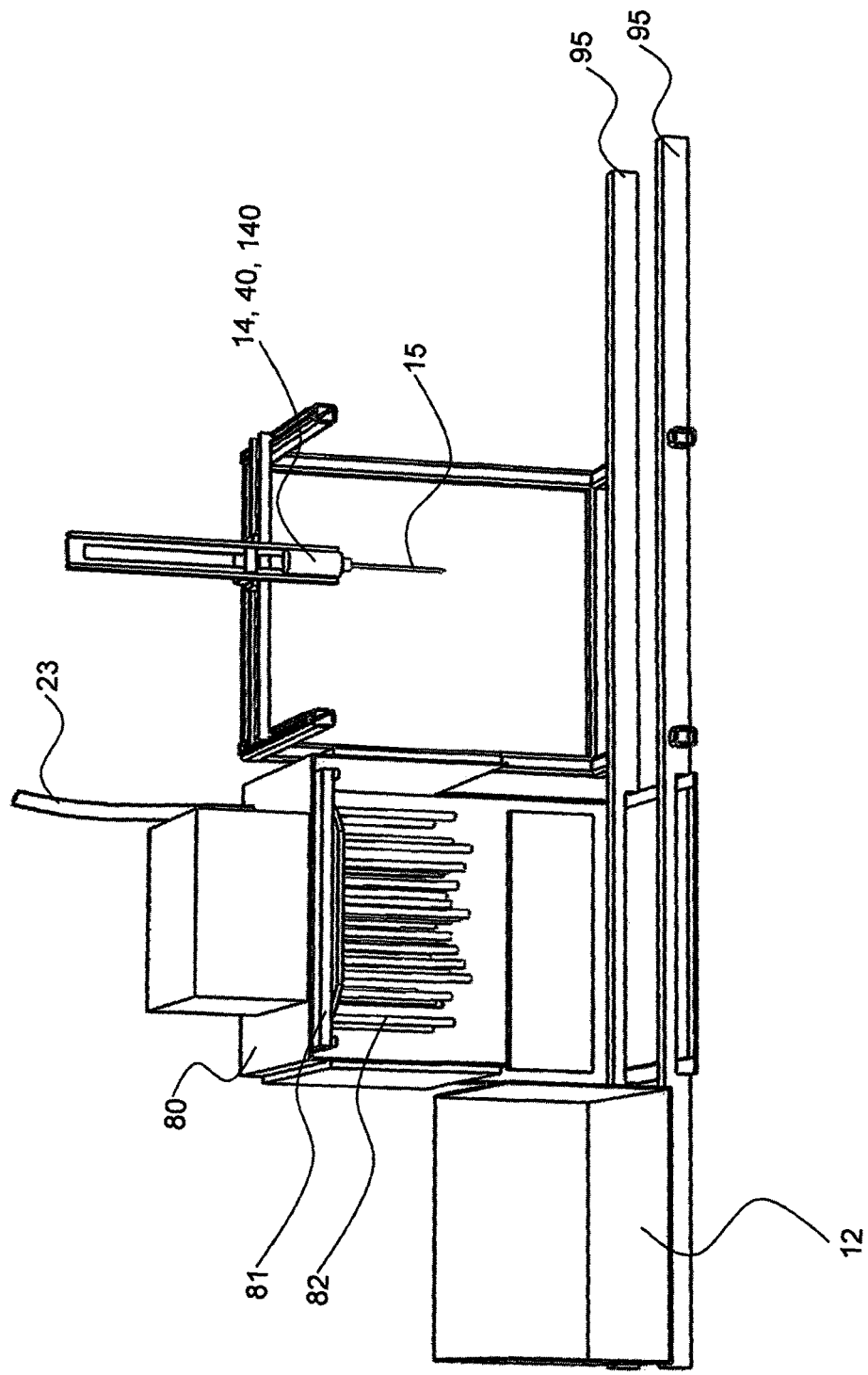
FIG. 17 is a cut out view of the units of FIG. 16.
Figure 18:
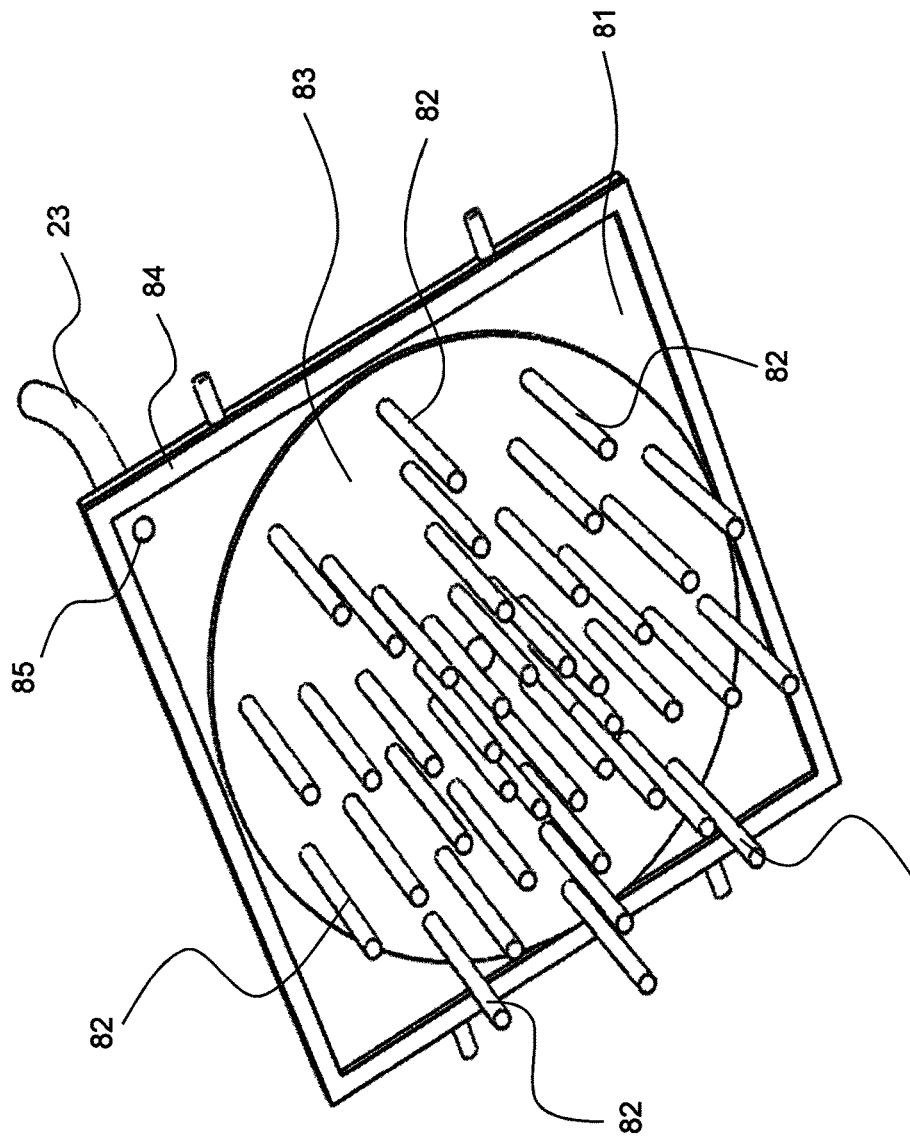
FIG. 18 is a perspective view of an embodiment of an agitator forming part of a unit of the device of FIG. 16.

In FIG. 15 an ultrasonic transducer 380 is mounted to the dispensing head 340 either in addition to, or instead of, the transducer 280. However, so as to minimise the impact on the resolution of the finished component, it is preferred that the amplitude of the ultrasonic wave is limited to around half the layer thickness achieved by the method of the present invention, but a frequency of 18 kHz or more.

A nozzle cleaning cycle may be incorporated in the process for building the component 20 in order to prevent or limit the nozzle(s) from clogging up during a build. The nozzle cleaning cycle will comprise the flushing of the nozzle(s) of the dispensing head with a cleaning solution and a separate bath or drain is provided to receive the used cleaning solution. After the flushing process, the dispensing head will prime the nozzle(s) with the fluid component before continuing the build. The nozzle cleaning process should take approximately 5 minutes. In preferred arrangements, the cleaning cycle occurs after every 60 minutes of build time. It would be understood that the cleaning cycle may be programmed to occur at a different time interval.

A second embodiment of a 3D printing device in accordance with the invention will now be described with particular reference to FIGS. 16 to 19*d*.

The printing device of the second embodiment is similar to the previously described embodiment and comprises a number of similar elements (only the differing elements are shown for simplicity). The second embodiment differs from previously described embodiment in that the vacuuming of the first fluid component and the construction of the component do not occur in the same containment.

In the second embodiment, the printing device comprises a vacuum unit 80 and a build area 90 separate to the vacuum unit 80 (i.e. the vacuuming of the first fluid component and the build of the component do not occur at the same location). While the vacuum unit 80 and build area are shown adjacent one another, it would be understood that a different arrangement may be possible.

The printing device comprises a suitable transfer device for moving the bath 12 to the vacuum unit 80, and from the vacuum unit 80 to the build area 90. The bath 12 is moved from the build area 90 prior to the basket (not shown) being removed from the bath 12 to the washing and rinsing stations as previously described. In the depicted embodiment, the transfer device comprises a pair of guide rails 95 which facilitate the transfer of the basket 12 between units/locations of the printing device.

The vacuum unit 80 comprises a movable platform 81 which is configured to engage with a bath 12 within the vacuum unit 80. The platform 81 comprises a seal 84 on the peripheral edge thereof (see FIG. 18) which on contact with the bath 12 seals the bath to create a closed containment.

The platform 81 further comprises an aperture 85 connected to the vacuum line 23 and a plurality of stirring rods 82 extending therefrom. The stirring rods 82 are mounted on a turntable 83 which is connected to a motor 86. The motor 86 actuates the turntable 83 to rotate at a desired speed. The stirring rods 82 may be arranged in a symmetrical pattern or an asymmetrical pattern on the turntable 83. In the embodiment shown, the stirring rods 82 are of a length such that when the platform 81 engages with the bath 12, the stirring rods 82 extend substantially into the bath 12.

In use, the bath 12 is first filled with the first fluid component from which the component 20 is to be created i.e. silicone oil, cross linker, thickener etc. The bath 12 is then moved to the vacuum unit (see FIG. 19a) where it is heated to reduce the viscosity of the first fluid component. A typical temperature to heat the first fluid component to is around 180° C.

Figure 19A:
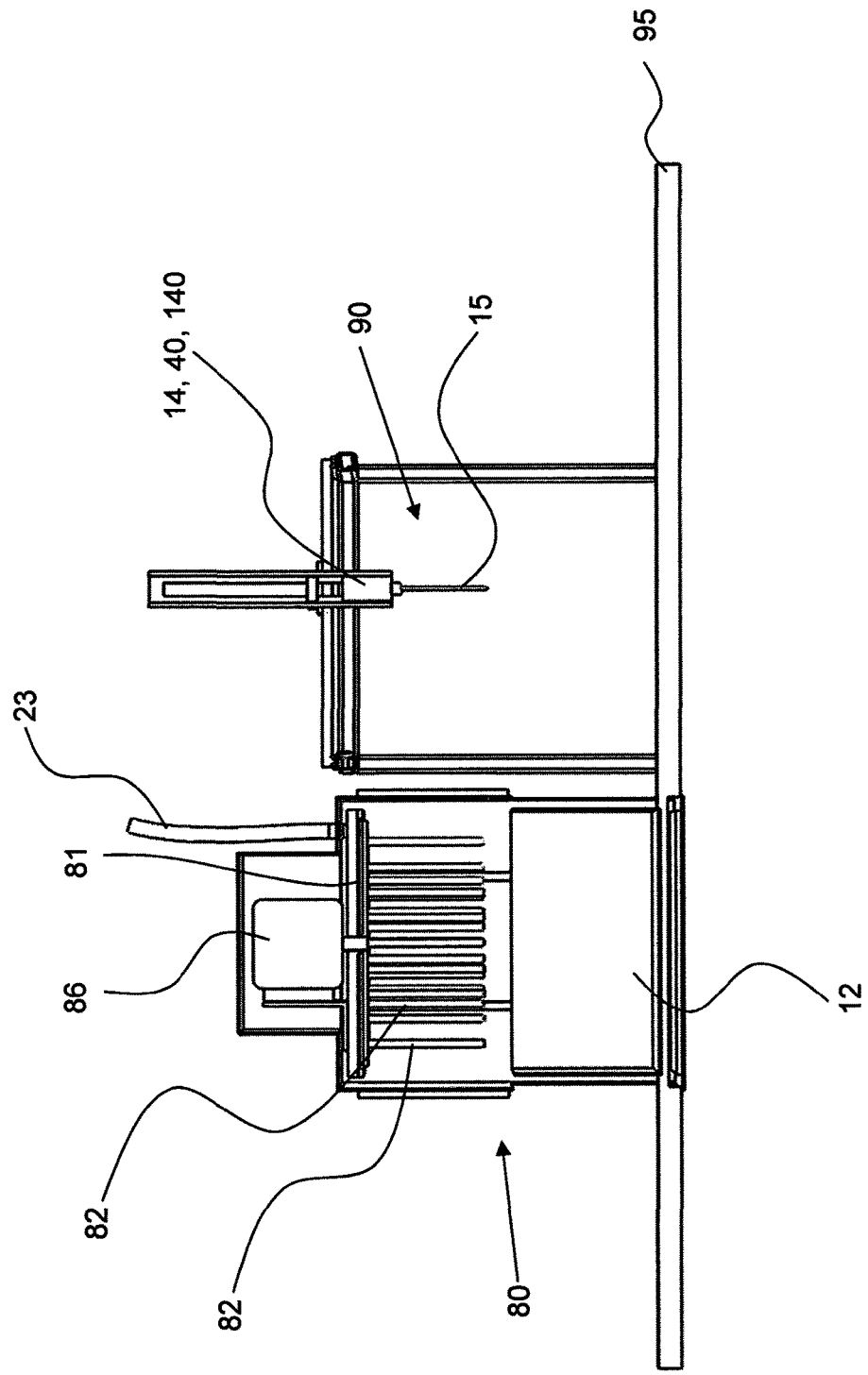
FIGS. 19a to 19d illustrate the preparation of a first fluid component prior to build-up of a solid component.
Figure 19B:
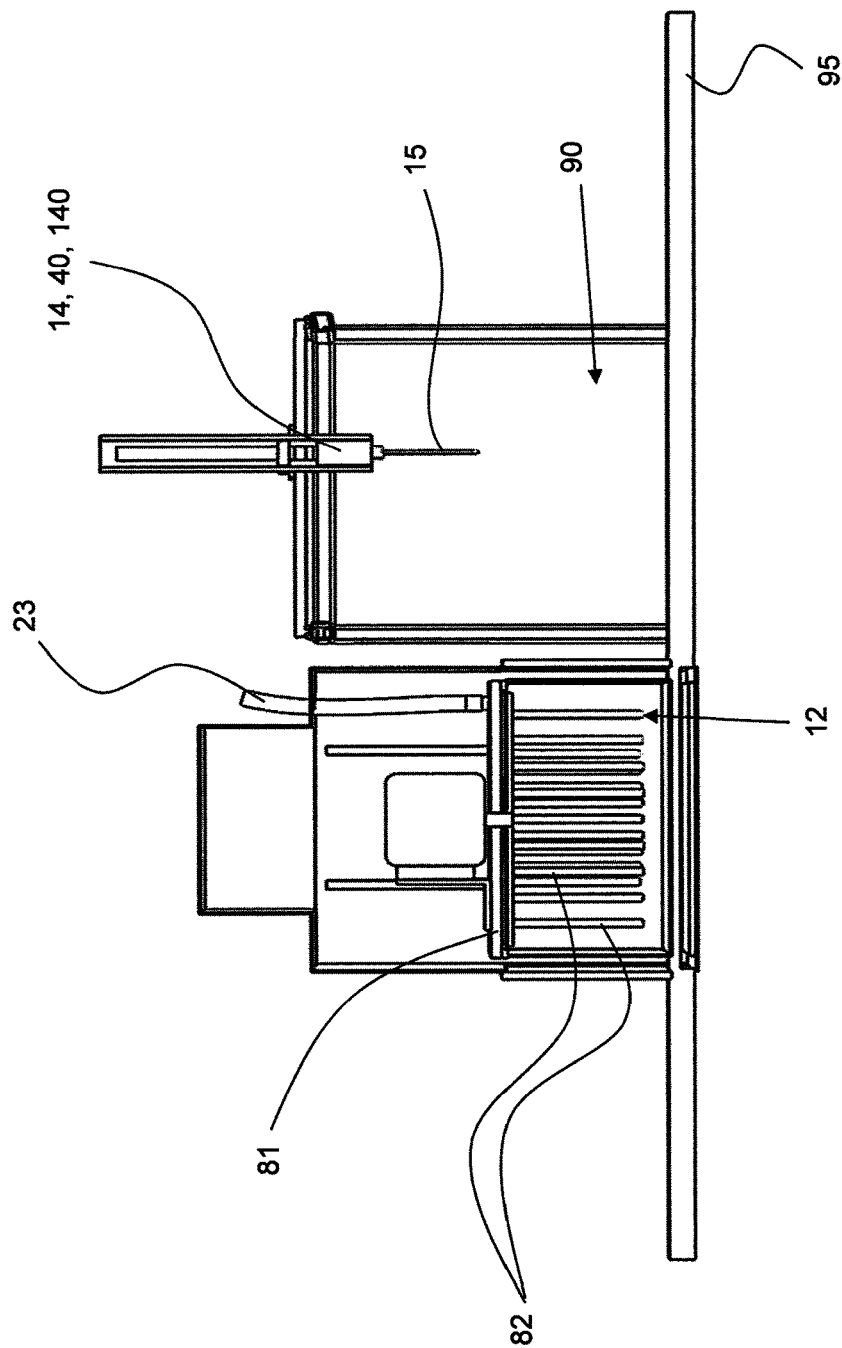
Figure 19C:
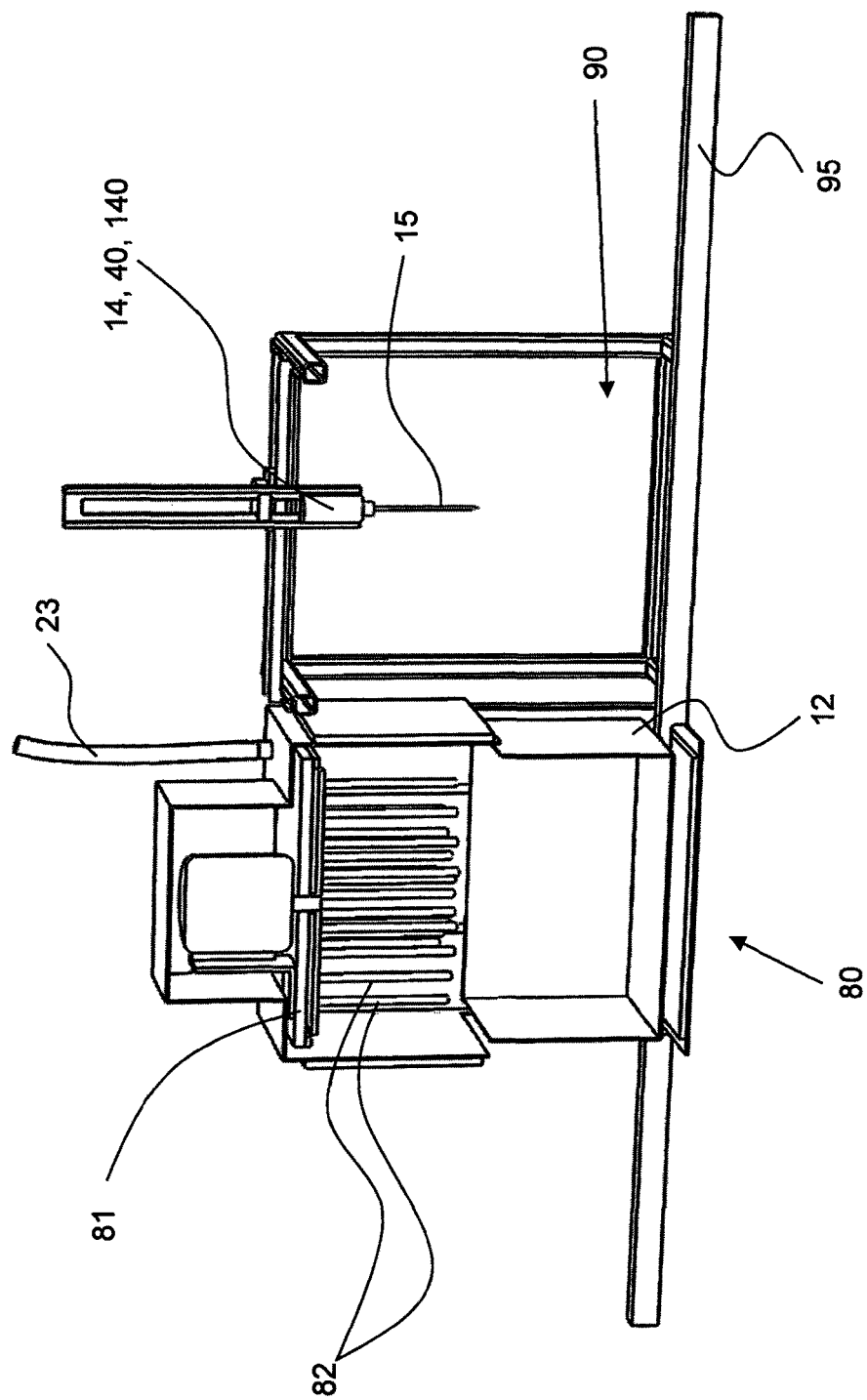

Once heated, the platform 81 is lowered to seal off the bath 12 (see FIG. 19b). The motor 86 is then switched on and the turntable 83 rotated. This causes the stirring rods 82 to physically agitate the first fluid component while moving in a circular motion.

Air is then drawn out of the low viscosity first fluid component via the vacuum line 23 before the bath 12 is cooled back to room temperature. The cooling of the first fluid component back to room temperature increases the viscosity of the first fluid component towards its pre-heated value.

Figure 19D:
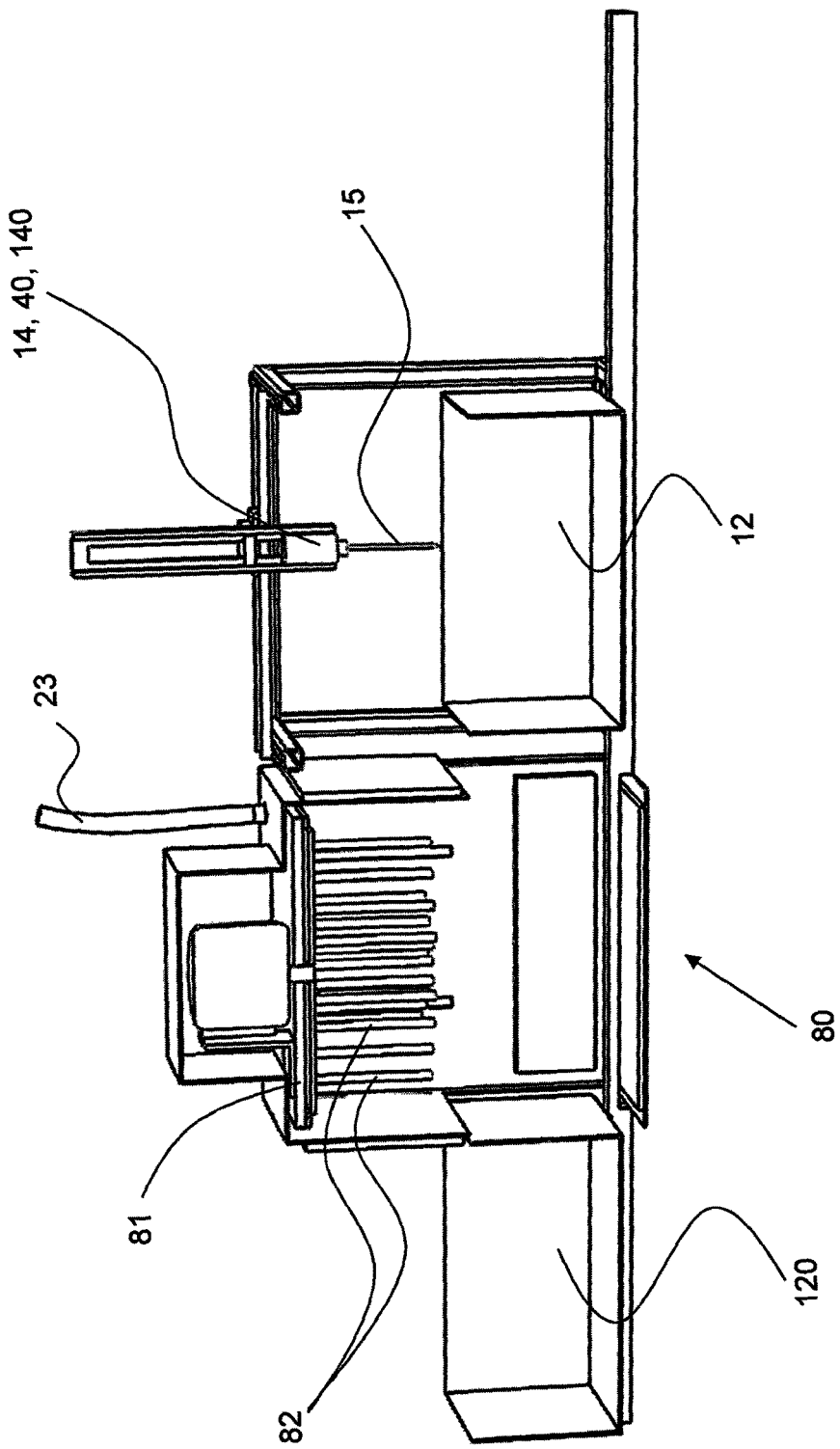

Once cooled, the platform 81 is lifted from the bath 12 (see FIG. 19c) prior to the bath 12 being moved to the build area (see FIG. 19d). Once in the build area, the nozzle 15 is lowered into the bath to a predetermined position which is selected as the starting point for production of the component, and the build of the component carried out as previously described.

As shown in FIG. 19d, a second bath 120 may be loaded up if necessary and processed through the vacuum chamber 80 in a similar way to the bath 12 while the build process is in progress.

In the description of the invention it is assumed that the first and second fluid components are of a single kind, and the quality of the finished component is determined by varying the properties of one or other of these components.

In an alternative one of the first and second fluid components may comprise a combined fluid capable of reaction with different fluids of the other of the first and second fluid components.

Thus it may be desired to use two fluid reactions which are independently stable and thus generally incompatible, for example a silicone/catalyst reaction and a two-pack epoxy reaction comprising a base and a hardener. In this example one of the components associated with each reaction (e.g. silicone and epoxy base) is combined in a first fluid component. Addition of one or other component (catalyst or epoxy hardener) will cause solidification of the combined components, which are arranged to be homogenously mixed. Sequential addition of the other components can be used to achieve significantly different physical properties in the finished component.

This aspect of the invention is not limited to two kinds of reaction fluids, but could comprise three or more such fluids so long as one component associated with each reaction is compatible and stable in a mixture, and the other component reacts only with its partner component.

In addition to different kinds of reactive components, it is envisaged that other materials may be added to the fluid component to be dispensed from the nozzle. For example a material providing properties of one or more of magnetism, fluorescence, smell and bacterial resistance may be mixed with the dispensable fluid, or dispensed from a nozzle at the same time as the dispensable fluid. Such materials may be in solid or fluid form, for example as a fine powder or a solution.

It is for example envisaged that a bank of additives may be provided consisting of a plurality of individual reservoirs of substances. Such a bank may be arranged similarly to a bank of colour additives in or on the stand 11. The appropriate additive is selected and supplied to the dispensing nozzle according to instructions contained in the digital record. Such additives may be added to different grades of catalyst or hardener to achieve the desired attributes of the component.

In a further alternative, the method of the invention may be used to add material to a substrate placed in the bath, such as forming a solid RTV silicone material around a pre-form of another material. Thus, for example, a silicone material could be added to footwear, or to a rigid implant for a human body, or to an electrical component.

The various aspects and embodiments of the invention may be combined in any appropriate manner, and the foregoing description is not intended to limit the invention to particular embodiments. The scope of the invention is defined in the accompanying claims.

What is claimed is:

1. A method of producing a three-dimensional component, comprising the steps of:
   providing a bath of a fluid first material;
   dispensing a fluid second material in said bath in a pattern defined by a digital record, contact between the first and second fluid materials converting one of said materials to a solid in the vicinity thereof; and
   removing the solid component from said bath when complete,
   wherein one of said first and second materials comprises at least one of a cross-linked and actively cross-linking polymer and the other of said first and second materials comprises a catalyst, the catalyst causing an acceleration of the cross-linking to convert the material to a solid,
   wherein the catalyst comprises platinum and/or rhodium.

2. A method according to claim 1, wherein the first fluid material comprises the catalyst and the fluid second material comprises the polymer.

3. A method according to claim 1, wherein the first fluid material comprises the polymer and the second fluid material comprises the catalyst.

4. A method according to claim 1 wherein the polymer is fluid silicone.

5. A method according to claim 4, wherein the fluid silicone is a silicone gel.

6. A method according to claim 1, wherein the polymer is a room temperature vulcanising silicone rubber.

7. A method according to claim 1, wherein the first fluid material comprises a thickener.

8. A method according to claim 1, further including the step of varying a physical and/or a visual property of said second fluid material prior to dispensing thereof.

9. A method according to claim 8, wherein said visual property comprises one or more of colour, reflectivity and fluorescence.

10. A method according to claim 8, wherein said physical property comprises one or more of smell, bacterial resistance, magnetism, electrical conductivity, reactive strength and reactive speed.

11. A method according to claim 8, wherein a visual and/or physical property is provided to said second fluid material prior to dispensing thereof.

12. A method according to claim 8 wherein said visual and/or physical property is varied by addition of a third fluid material comprising the selected visual and or physical property.

13. A method according to claim 1, further including the step of dispensing said second fluid material in said first fluid material via a nozzle movable with respect to said bath.

14. A method according to claim 1, wherein said bath is provided in a containment, and prior to dispensing said second fluid material said containment is evacuated to remove air entrained in said first fluid material.

15. A method according to claim 1, further including a basket in said bath, said second fluid material being dispensed within the perimeter of said basket, and further including the step of removing the solid component in said basket.

16. A method according to claim 1, further including the step of washing said component after removal from said bath, the washing fluid comprising a solvent for said first fluid material.

17. A method according to claim 16, including the step of dusting said component with a powder, optionally bicarbonate of soda or chalk, prior to the step of washing said component.

18. A method according to claim 1, wherein the first and/or second material are agitated to promote mixing thereof.

* * * * *